United States Patent [19]

Nino

[11] Patent Number: 4,953,063

[45] Date of Patent: Aug. 28, 1990

[54] VEHICULAR HEADLAMP

[75] Inventor: Naohi Nino, Shizuoka, Japan

[73] Assignee: Koito Manufacturing Co., Ltd., Tokyo, Japan

[21] Appl. No.: 411,287

[22] Filed: Sep. 22, 1989

[30] Foreign Application Priority Data

Sep. 27, 1988 [JP] Japan ............................... 63-241591

[51] Int. Cl.[5] ............................................... B60Q 1/00

[52] U.S. Cl. ...................................... 362/61; 362/305; 362/343; 362/346

[58] Field of Search ................. 362/61, 268, 297, 304, 362/305, 307, 308, 310, 343, 346, 347, 348, 349

[56] References Cited

U.S. PATENT DOCUMENTS

| | | | |
|---|---|---|---|
| 4,697,225 | 9/1987 | Lindae et al. . | |
| 4,755,919 | 7/1988 | Lindae et al. . | |
| 4,772,987 | 9/1988 | Kretschmer et al. . | |
| 4,879,636 | 11/1989 | Yamagishi et al. ................... | 362/61 |

*Primary Examiner*—Stephen F. Husar

*Attorney, Agent, or Firm*—Sughrue, Mion, Zinn, Macpeak & Seas

[57] ABSTRACT

Disclosed herein is a vehicular headlamp, which comprises a compound light reflector having a concave light reflecting surface which consists of upper, lower, left and right triangular parts which are radially arranged about a given portion of the reflector. The upper and lower parts have a substantially common focus and are so arranged that when light rays are emitted from the position of the common focus, the upper and lower parts reflect the light rays forward to form a horizontal focal line before the common focus. Each of the left and right parts is so shaped and arranged that when cut by a horizontal plane, it shows an elliptic line along the cut edge, and when cut by a vertical plane, it shows a parabolic line along the cut edge. The upper, lower, left and right parts are so arranged as to have their focuses positioned at generally same position. A light source is positioned at the common focus, and a converging lens is positioned in front of the horizontal focal line and arranged in such a manner that a focus of the converging lens is positioned in the vicinity of the horizontal focal line. If desired, a shading plate may be employed. In this case, the shading plate is arranged in the vicinity of the horizontal focal line.

20 Claims, 24 Drawing Sheets

VEHICULAR HEADLAMP

BACKGROUND OF THE INVENTION

1. Field of the Invention

The present invention relates in general to vehicular headlamps, and more particularly to vehicular headlamps of a type which generally comprises a concave light reflector, a light source located in front of the light reflector and a cover lens covering the front of the light reflector.

2. Description of the Prior Art

Hitherto, various types of vehicular headlamps have been proposed and put into practical use particularly in the field of wheeled motor vehicles. Some of them are of a type which comprises a light reflector having a light reflecting surface of paraboloid of revolution, a light source located at or in the vicinity of the focus of the light reflecting surface, and a step lens covering the front of the reflector Nowadays, for reasons of improving the external appearance and reducing aerodynamic drag, some motor vehicles are designed to have slanted noses compelling the headlamps to reduce their sizes, particularly their heights. Thus, it has sometimes occurred that the light beams projected by the headlamps fail to possess effective illumination power. Furthermore, for the reason of reducing aerodynamic drag, some of the vehicles have the step cover lens inclined backward to be flush with the outer surface of the slanted nose. In this case, however, lowering in light transmission through the lens, leakage of light beams through risers of the lens steps and useless downward projection of the light beams at both sides of the lens inevitably take place. Thus, in this case, the poor illumination phenomenon becomes much severe.

SUMMARY OF THE INVENTION

It is therefore an essential object of the present invention to provide a vehicular headlamp which is free of the above-mentioned drawbacks.

According to the present invention, there is provided a vehicular headlamp which can solve the above-mentioned drawbacks without using a step lens.

According to the present invention, there is provided a vehicular headlamp which comprises a compound light reflector including upper, lower, left and right concave light reflecting surface parts which are radially arranged about a given portion of the reflector, the upper and lower parts having a common focus and being so arranged that when light rays are emitted from the position of the common focus, the upper and lower parts reflect the light rays forward to form a horizontal focal line before the common focus, each of the left and right parts being so shaped that when cut by a horizontal plane, it shows an elliptic line along the cut edge, and when cut by a vertical plane, it shows a parabolic line along the cut edge, the upper, lower, left and right parts being so arranged as to have their focuses positioned at substantially the same position; a light source positioned at the common focus; and a converging lens positioned in front of the horizontal focal line and arranged in such a manner that a focus of the converging lens is positioned in the vicinity of the horizontal focal line.

BRIEF DESCRIPTION OF THE DRAWINGS

Other objects and advantages of the present invention will become apparent from the following description when taken in conjunction with the accompanying drawings, in which:

FIGS. 1 to 3 are drawings showing headlamps which were thought out by the inventor for finding out the basic concept of the present invention, in which:

FIG. 1 is a front view of one headlamp with a light source and a lens removed;

FIG. 2 is a sectional view of the headlamp; and

FIG. 3 is a sectional view of another headlamp;

FIGS. 4 to 8 are drawings showing a vehicular headlamp which is a first embodiment of the present invention, in which:

FIG. 4 is a schematically illustrated perspective view of the headlamp of the first embodiment;

FIG. 5 is a front view of a light reflector employed in the headlamp of the first embodiment;

FIG. 6 is a horizontally sectional view of the headlamp of the first embodiment;

FIG. 7 is a vertically sectional view of the headlamp of the first embodiment; and FIG. 8 is a view of a projected beam pattern which is provided by the headlamp of the first embodiment;

FIGS. 9 to 12 are drawings showing the results of a computer aided simulation analysis which was carried out by the inventor, in which:

FIGS. 9, 10 and 11 are perspective, front and plan views of a unit consisting of a light reflecting surface and a light emitting filament, which unit was subjected to the computer aided simulation analysis;

FIGS. 12A and 12B are drawings showing the results of the computer aided simulation analysis, in which FIG. 12A shows a projected image of the filament on a front lens, and FIG. 12B shows a projected image of the filament on a distant screen;

FIGS. 14 to 24 are drawings showing a vehicular $ headlamp which is a second embodiment of the present invention, in which:

FIG. 14 is a schematically illustrated perspective view of the headlamp of the second embodiment;

FIG. 15 is a vertically sectional view of the headlamp of the second embodiment;

FIG. 16 is a horizontally sectional view of the headlamp of the second embodiment;

FIG. 17 is a view of a projected beam pattern which is provided by the headlamp of the second embodiment;

FIGS. 18 and 19 are drawings showing a first modification of the second embodiment, in which:

FIG. 18 is a vertically sectional view of the headlamp of the first modification; and FIG. 19 is a view of a projected beam pattern which is provided by the headlamp of the first modification;

FIGS. 20 and 21 are drawings showing a second modification of the second embodiment, in which:

FIG. 20 is a schematically illustrated perspective view of the headlamp of the second embodiment; and FIG. 21 is a view of a projected beam pattern modification;

FIGS. 22 to 24 are drawings showing a third modification of the second embodiment, in which:

FIG. 22 is a schematically illustrated perspective view of the headlamp of the third modification;

FIG. 23 is a view of a projected beam pattern which is provided by the headlamp of the third modification.

DETAILED DESCRIPTION OF THE INVENTION

Figure 1:
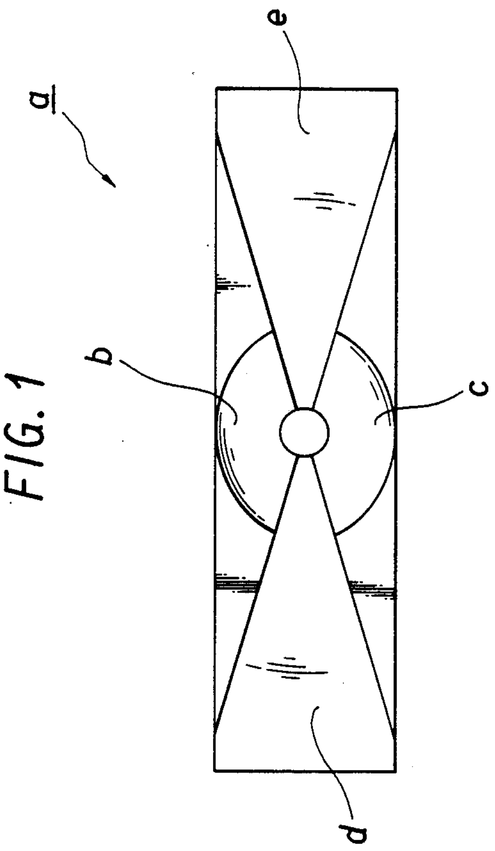
Figure 2:
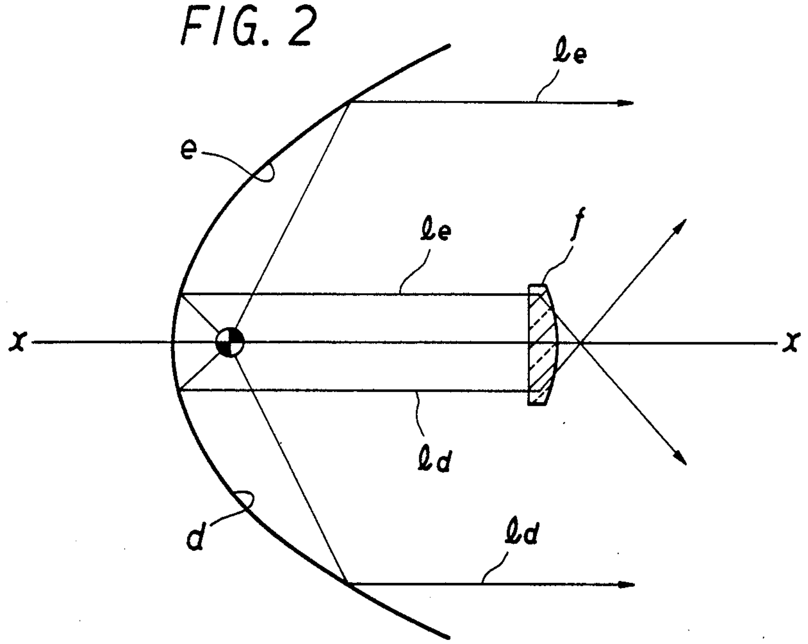
Figure 3:
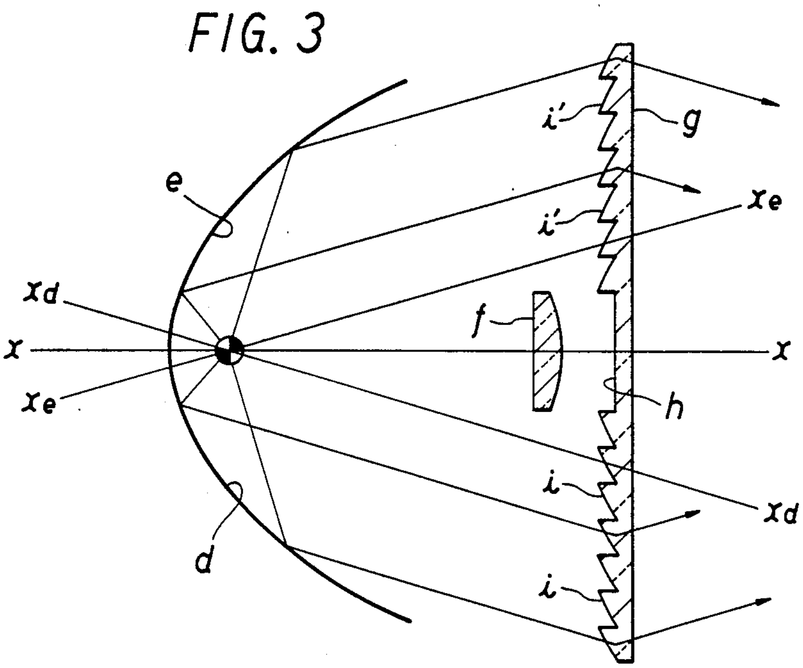

In order to find out the basic concept of the present invention, several headlamps were thought out by the inventor, which are illustrated in FIGS. 1 to 3.

FIG. 1 shows a laterally elongated rectangular reflector 'a' which has a concave light reflecting surface consisting of four triangular parts which are an upper part 'b', a lower part 'c', a left part 'd' and a right part 'e', as viewed from the front of the reflector 'a'. The upper and lower parts 'b' and 'c' are shaped to have at their front portion a common horizontal focal line. A converging lens 'f' is located in front of the reflector 'a', through which the reflected light rays from the upper and lower parts 'b' and 'c' pass to produce a somewhat widen projected beam pattern. Thus, the light rays reflected by the parts 'b' and 'c' constitute a light diffused zone of the light beams projected from the lens 'f'. While, the light rays reflected by the left and right parts 'd' and 'e' constitute both a hot zone of the light beams projected from the lens 'f' and a widely spreaded zone of the light beams which do not pass through the lens 'f'.

The left and right parts 'd' and 'e' constitute parabolic light reflecting surfaces.

However, as is shown in FIG. 2, if the optical axes 'xd-xd' and 'xe-xe' of the left and right parts 'd' and 'e' are in coincidence with the light projecting axis 'X-X' of the reflector 'a', the central portions of the reflected light rays 'ld', 'ld', . . . 'le', 'le', . . . from the left and right light reflecting parts 'd' and 'e' are led into the lens 'f' and largely diffused by the same. This causes a loss of the light rays which are to be used for constituting the hot zone.

In order to solve this drawback, the following measure was thought out. That is, as is seen from FIG. 3, in this measure, the optical axes 'xd-xd' and 'xe-xe' of the left and right parts 'd' and 'e' are inclined sidewardly with respect to the light projecting axis 'X—X' of the reflector 'a'. With this, the central portions of the light rays from the left and right reflecting parts 'd' and 'e' are prevented from passing through the lens 'f'. However, this time, there is inevitably produced a less illuminated zone between an illuminated zone provided by the reflected light rays from the left part 'd' and another illuminated zone provided by the reflected light rays from the right part 'e'. This is because the reflected light rays from each part go in parallel with the optical axis 'xd-xd' or 'xe-xe'. More specifically, the reflected light rays from the left and right parts 'd' and 'e' do not contribute to the formation of the hot zone. In fact, in this case, the hot zone is provided by only the reflected light rays from the upper and lower light reflecting parts 'b' and 'c'

In order to solve this drawback, the following measure was further thought out. That is, as is seen from FIG. 3, a step lens 'g' is employed as a front cover lens. The step lens 'g' has at a position just before the lens 'f' a flat part 'h' and has further at its left half (as viewed from the front of the lens 'g') a first group of steps 'i', 'i', . . . 'i' by which the reflected light rays from the left part 'd' are refracted toward the light projecting axis 'X—X' and at its right half a second group of steps 'i'', 'i'', . . . 'i'' by which the reflected light rays from the right part 'e' are refracted toward the light projected axis 'X—X'. Thus, in this measure, the reflected light rays from the left and right parts 'd' and 'e' can contribute to the formation of the hot zone. However, this time, this measure is largely dependent upon the front cover lens 'g', and thus, this measure has the afore-mentioned disadvantages of the prior art headlamps.

The present invention is provided by taking the above-mentioned various matters into consideration.

Referring to FIGS. 4 to 8, there is shown a vehicular headlamp of a first embodiment of the present invention.

For ease of understanding, the description will be made on each of parts of the headlamp, in order.

REFLECTOR (see FIGS. 4 to 7)

In the drawings, denoted by numeral 1 is a vehicular headlamp of the first embodiment. Designated by numeral 2 is a laterally elongated rectangular concave reflector.

The reflector 2 has a concave light reflecting surface consisting of four triangular parts which are an upper part 3, a lower part 4, a left part 5 and a right part 6, as viewed from the front of the reflector 2. As is seen from FIG. 1, the upper and lower parts 3 and 4 have respective lateral ends separated from each other with given clearances therebetween. Each clearance gradually increases with increase of distance from the depth of the concave reflector 2. These upper and lower parts 3 and 4 are shaped to have at their front portion a common horizontal focal line. As these parts, various types of known reflecting surfaces may be used. For example, a so-called 'paraboloid and ellipsoid' compound light reflecting surface is usable.

As is known, such compound light reflecting surface has the following features.

That is, when cut by a horizontal plane, it shows a parabolic line along the cut edge, while, when cut by a vertical plane, it shows an elliptic line along the cut edge. Furthermore, the parabolic line and the elliptic line are arranged to have a common axis, and the focus of the parabolic line and a first focus of the elliptic line are located at the same position.

In addition to such paraboloid and ellipsoid compound light reflecting surface, the following reflecting surface is also employable.

That is, when cut by a horizontal plane, it shows an elliptic line along the cut edge, and when cut by a vertical plane, it shows another elliptic line along the cut edge, and these two elliptic lines have a common axis and a common first focus. Beside this, a second focus of the elliptic line provided by the vertical plane is positioned more distant from the reflector 2 than a second focus of the elliptic line provided by the horizontal plane.

Accordingly, when a light source is located on the focus $F_o$ of the upper and lower parts 3 and 4, the light rays from the light source are reflected forward by the parts 3 and 4 and converged to form a horizontal focal line $F_2$.

The left and right light reflecting parts 5 and 6 are each shaped like a sector which extends forward and laterally outwardly. When cut by a horizontal plane, these left and right parts 5 and 6 show an elliptic line along the cut edge, and when cut by a horizontal plane, these parts 5 and 6 show a parabolic line along the cut edge. The first focus of the elliptic line and the focus of the parabolic line are located at the same position, and these elliptic line and the parabolic line have a common axis. The second focuses $F_5$ and $F_6$ o of the elliptic lines are positioned distant from the reflector 2.

The left and right parts 5 and 6 have focuses on the focus $F_o$ of the upper and lower parts 3 and 4. The axes of the upper and lower parts 3 and 4 extend forward to constitute a light projecting axis 'X—X' The optical axis 'xl—xl' of the left part 5 is inclined rightward with respect to the axis 'X—X', while the optical axis 'xr—xr' of the right part 6 is inclined leftward with respect to the axis 'X—X', as is understood from the drawings.

Figure 4:
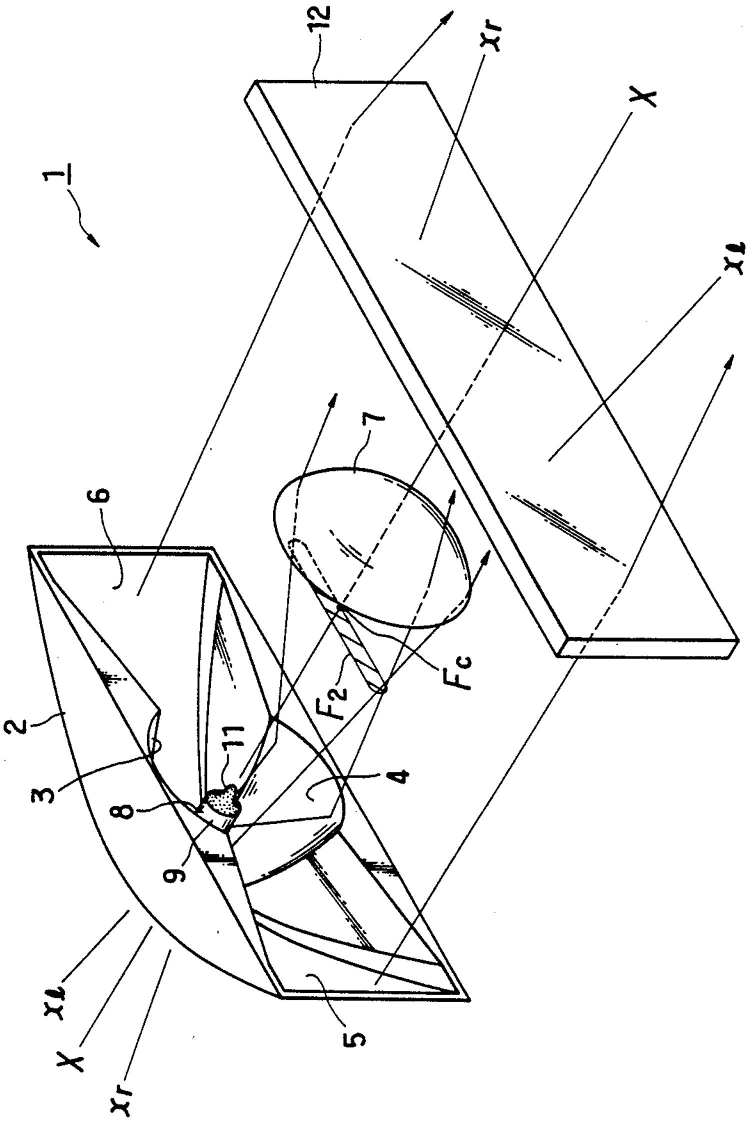
Figure 5:
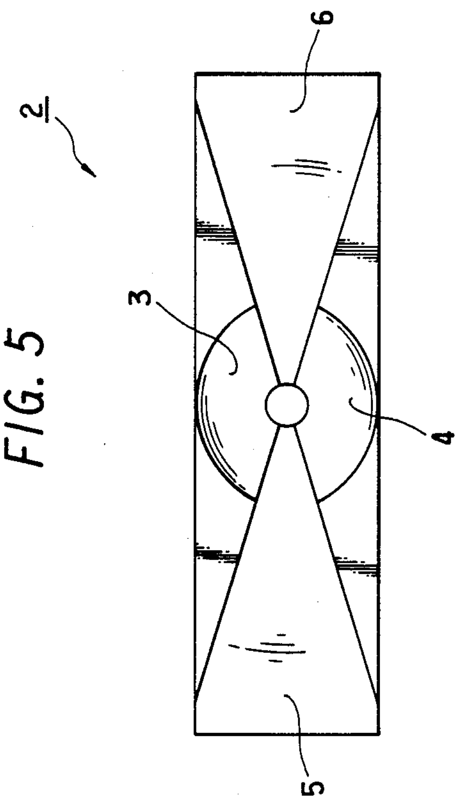
Figure 6:
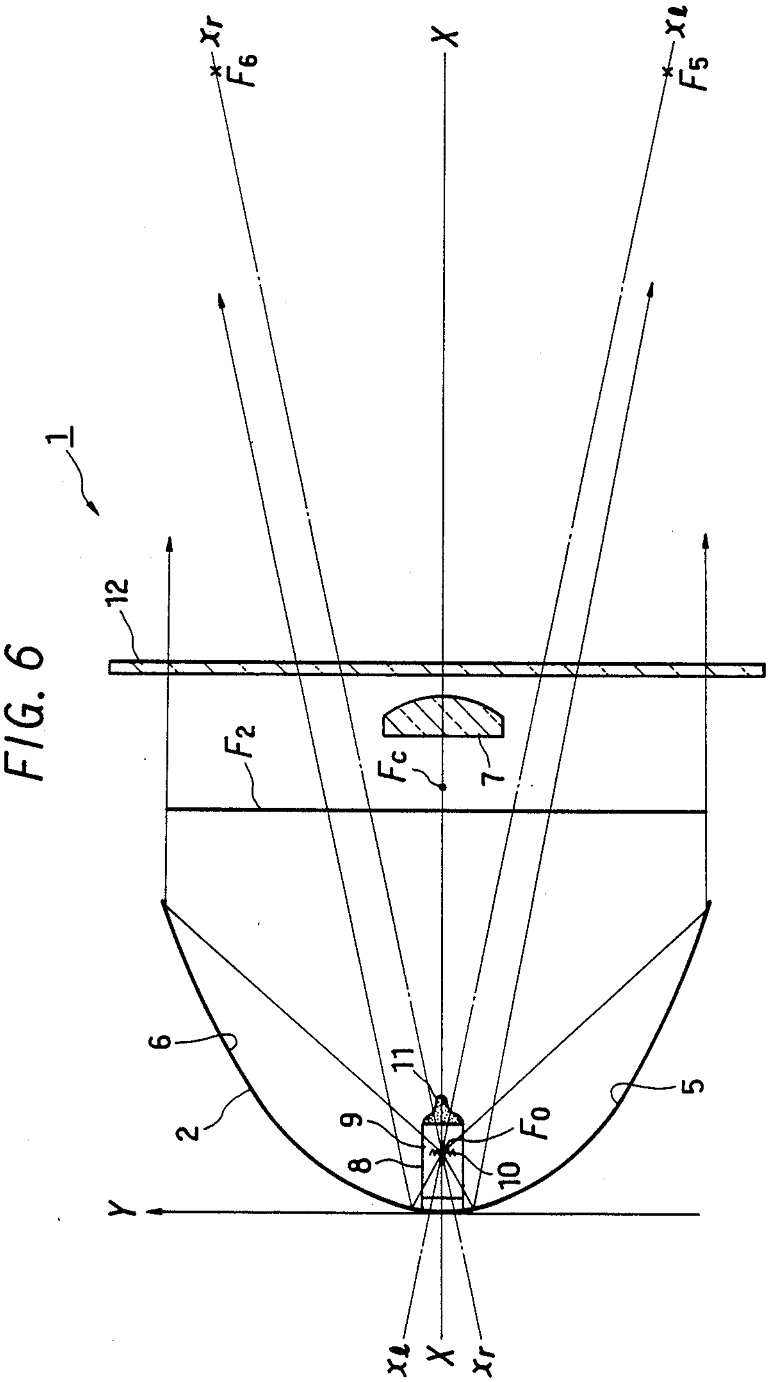
Figure 7:
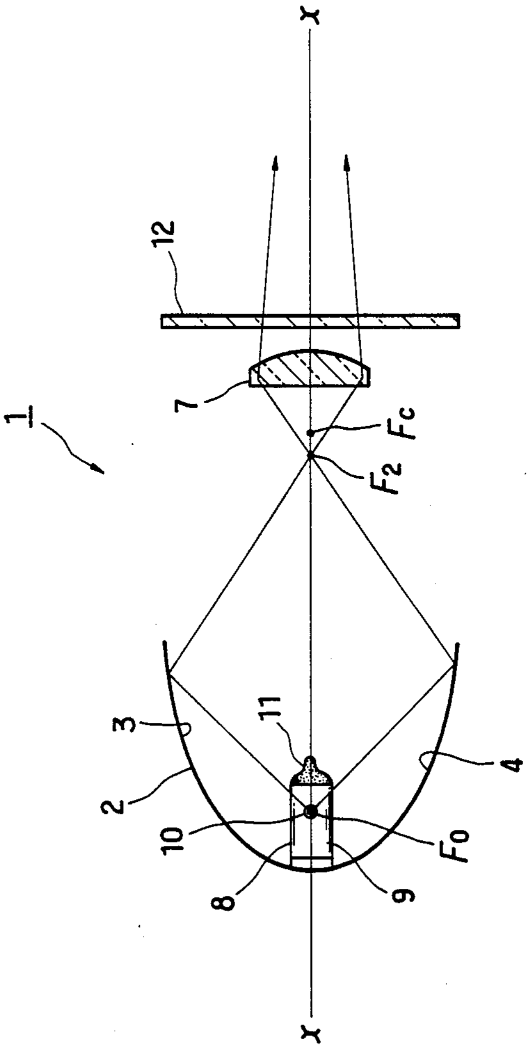

CONVERGING LENS (see FIGS. 4, 6 and 7)

Denoted by numeral 7 is a converging lens which is arranged in front of the upper and lower parts 3 and 4 of the above-mentioned reflector 2. The lens 7 has its focus $F_c$ located in the vicinity of the horizontal focal line $F_2$ of the upper and lower parts 3 and 4.

Accordingly, the light rays reflected by the upper and lower parts 3 and 4 and collected at the horizontal focal line $F_2$ are passed through the converging lens 7 to project a reversed image of the focal line forwardly of the lens. Because the focal line has a considerable dimension in lateral direction, the projected beam pattern has a laterally elongated shape.

ELECTRIC BULB (see FIGS. 4, 6 and 7)

Designated by numeral 8 is an electric bulb which is supported by the reflector 2. The electric bulb 8 has in its glass tube 9 a filament 10 which extends perpendicular to the light projecting axis 'X—X' while passing through the focus $F_o$ *of the upper and lower light reflecting surfaces* 3 *and* 4 *of the reflector* 2.

Designated by numeral 11 is a light blocking film attached to a front portion of the glass tube 9. With provision of this film 11, the light rays produced by the filament 10 are prevented from directly reaching the lens 7. That is, only the light rays reflected by the reflector 2 are permitted to travel forward to produce the projected beam pattern.

FRONT COVER LENS (see FIGS. 4, 6 & 7)

Designated by numeral 12 is a front cover lens which is arranged to cover the front of the reflector 2 with an interposal of the converging lens 7 therebetween. The front cover lens 12 is of a flattened transparent member.

Figure 8:
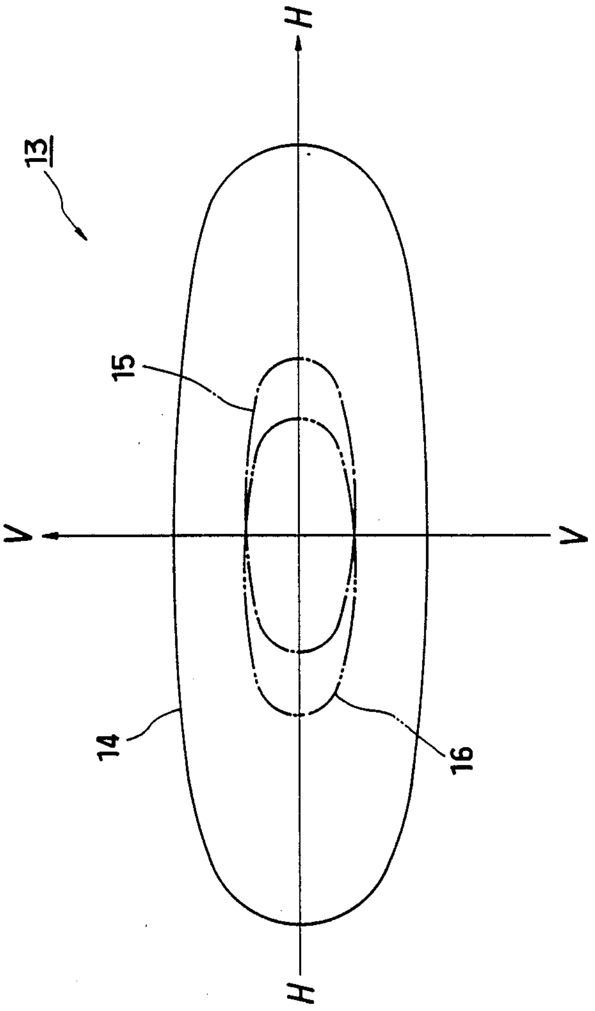
Figure 9:
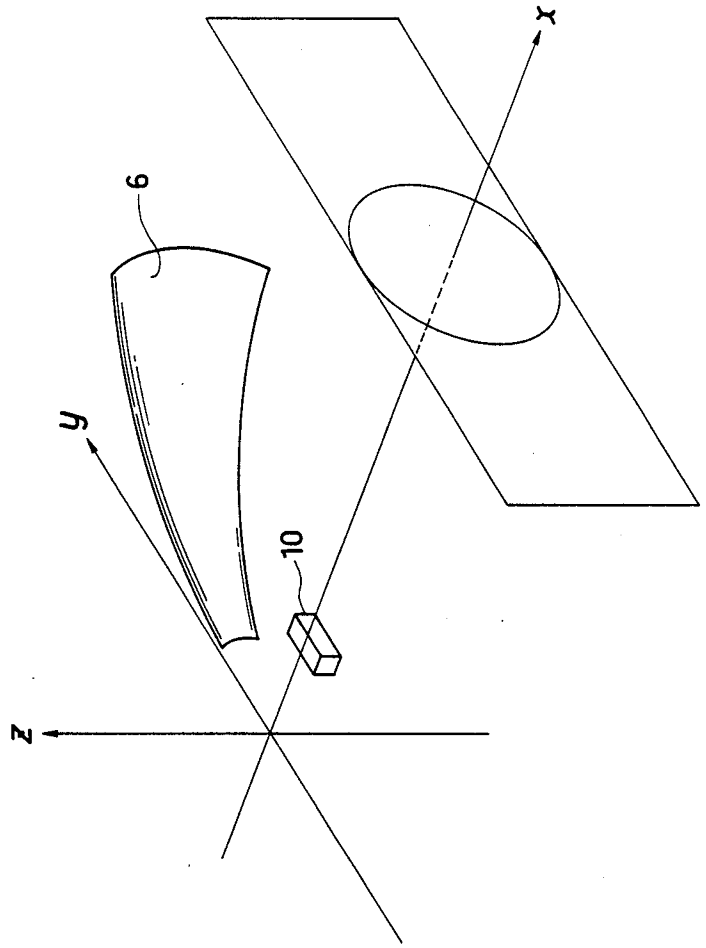
Figure 10:
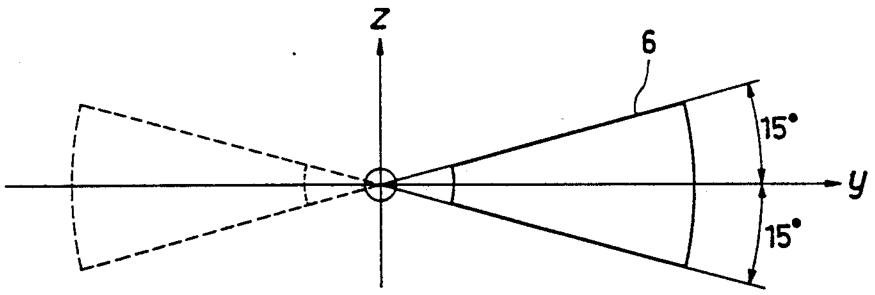
Figure 11:
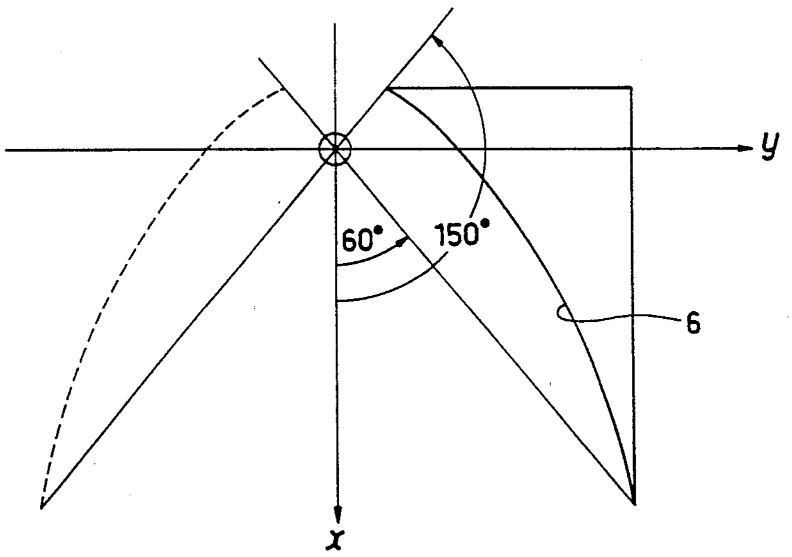

PROJECTED BEAM PATTERN (see FIG. 8)

When the vehicular headlamp 1 having the above-described arrangement is energized, such a projected beam pattern 13 as shown in FIG. 8 is provided. It is to be noted that the pattern shown in FIG. 8 is an image illuminated on a screen positioned in front of the headlamp 1. The line V—V is the line corresponding to a vertical line which extends vertically through a center of the vehicle on which the headlamp 1 is mounted, while, the line H-H is the line corresponding to a horizontal line which extends horizontally through the center of the vehicle.

It is to be noted that the zone denoted by numeral 14 is an illuminated zone which is provided by the reflected light rays from the upper and lower parts 3 and 4 of the reflector 2. As is shown, the zone has a laterally elongated pattern and has the intersecting point of the V—V line and the H—H line at the center thereof.

The zone denoted by numeral 15 is an illuminated zone which is provided by the reflected light rays from the left part 5 of the reflector 2. As shown, the zone has a relatively small and laterally elongated pattern and is positioned at the right of the center. The zone denoted by numeral 16 is an illuminated zone which is provided by the reflected light rays from the right part 6 of the reflector 2. The zone 16 has a relatively small and laterally elongated pattern and is positioned at the left of the center. The illuminated zones 15 and 16 have inside portions largely overlapped. The overlapped portions of the zones 15 and 16 constitute a so-called hot zone of the projected beam pattern 13, which zone is highly illuminated as compared with its surrounding.

As is understood from the above description, the vehicular headlamp 1 of the first embodiment can provide the projected beam pattern with a laterally elongated hot zone at the central portion of the pattern. The pattern is very suitable for a projected beam pattern which has been highly desired. It is to be noted that the pattern is provided without asking the aid of the front cover lens 12. It is further to be noted that as is seen from FIG. 6, the reflected light rays from the left and right parts 5 and 6 of the reflector 2 are prevented from getting in the converging lens 7. Thus, undesired light loss is minimized.

COMPUTER AIDED SIMULATION ANALYSIS (see FIGS. 9 to 12)

In order to make clear the above-mentioned advantages of the first embodiment, the inventor carried out a computer aided simulation analysis on the first embodiment, which will be described in the following.

Left and right light reflecting surfaces and a light source (viz., a filament) are positioned with respect to x, y and z coordinates programmed in a computer. The light reflecting surfaces (5) and 6 have each such a shape that when cut by a vertical plane, it shows a parabolic line along the cut edge, and when cut by a horizontal plane, it shows an elliptic line along the cut edge.

Since the reflecting surfaces (5) and 6 are arranged symmetrically, the following explanation will be directed to only the right reflecting surface 6.

The parabolic line of the surface 6 provided when cut by the vertical plane has a focal distance of 20 mm, while the elliptic line of the surface 6 provided when cut by the horizontal plane has a first focal distance of 20 mm and a second focal distance of 408.3 mm.

The effective area of the light reflecting surface 6 is the sectoral zone which extends vertically from −15 degrees to +15 degrees of the y-axis with respect to the x-axis. Furthermore, the effective area extends from 60 degrees to 150 degrees of the x-axis as viewed on the x-y plane. The x-axis is inclined by 11.9 degrees with respect to the light projecting axis 'X—X'.

The filament is computed like a square pole which is 5 mm in length and 1.5 mm in each side. The filament is positioned at its center on the point of 20 mm of the x-axis and extends in parallel with the y-axis.

Figure 12A:
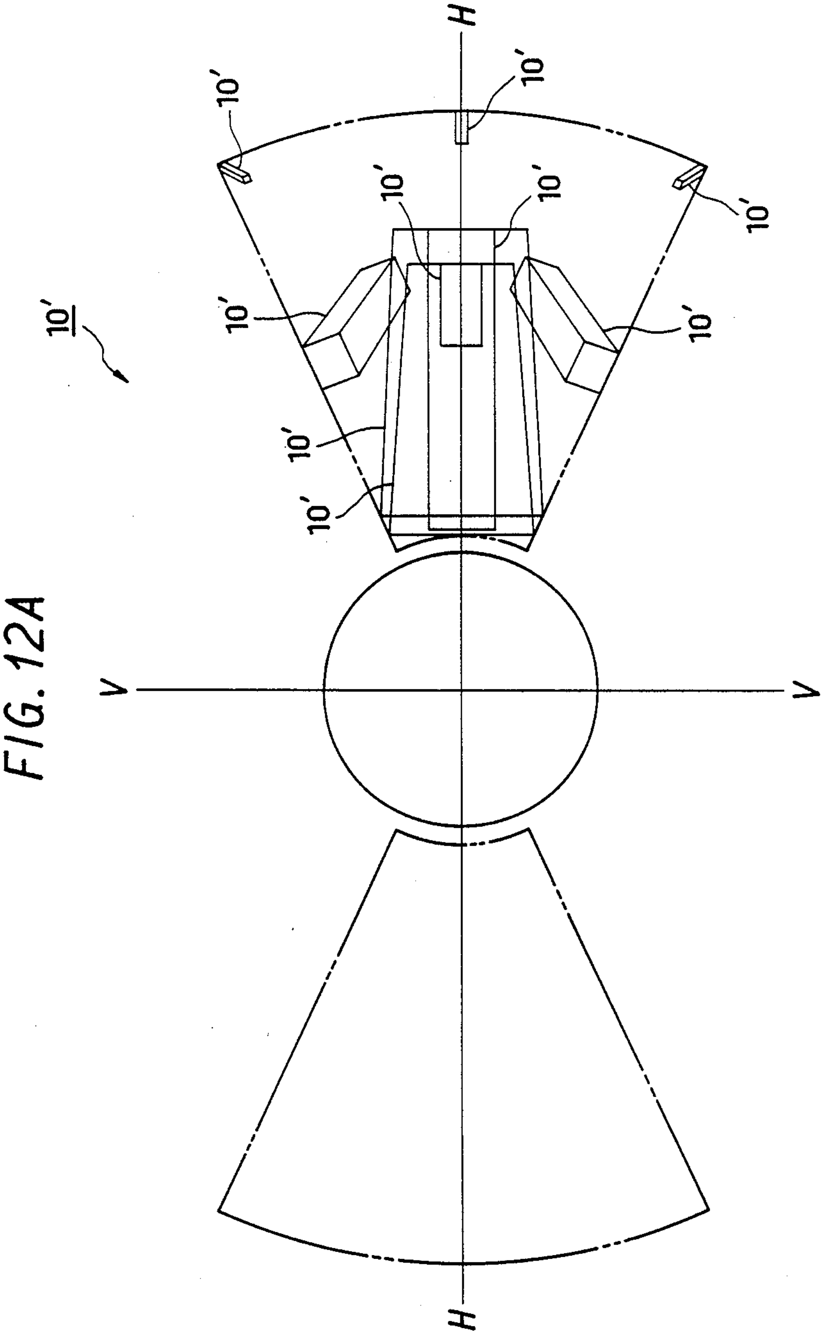
Figure 12B:
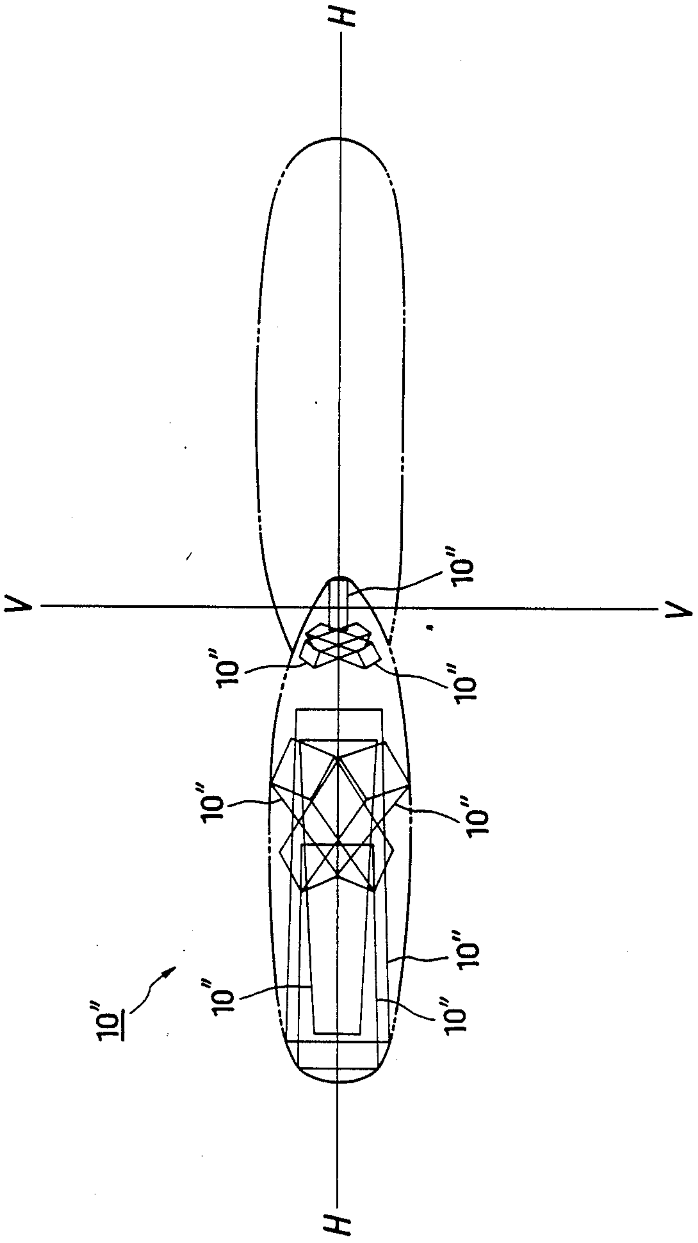

The results of the computer aided simulation analysis carried out on the above-mentioned conditions are shown in FIGS. 12A and 12B.

FIG. 12A shows images 10', 10', . . . 10' of the filament 10 reflected in the front cover lens 12. As shown, these images are positioned at a right side of a circle of 40 mm in diameter (which corresponds to the diameter of the converging lens 7), the circle having its center at the light projecting axis 'X—X'. A screen positioned at a distance of 10 m from the headlamp shows such projected beam patterns 10 , 10', 10', . . . 10' as shown in FIG. 12B.

Figure 13A:
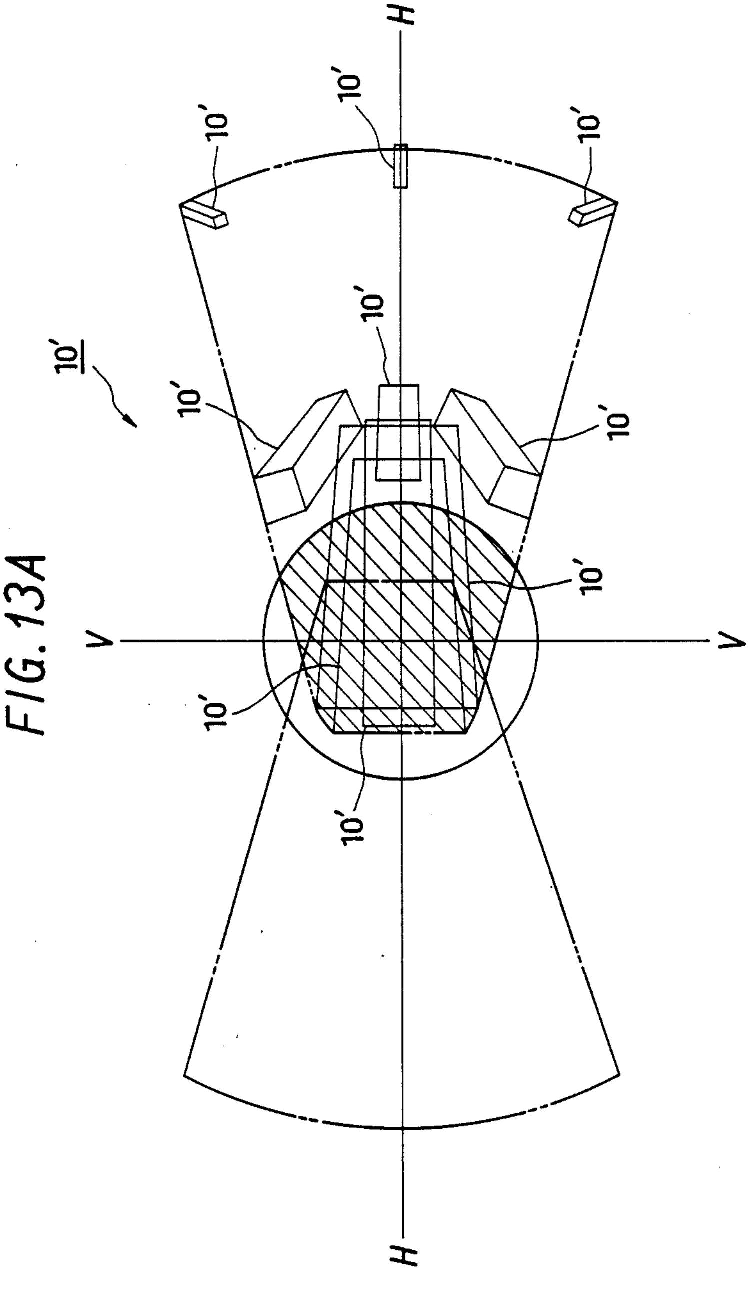
FIGS. 13A and 13B are views similar to FIGS. 12A and 12B, but showing the results of the computer aided simulation analysis on the concept of FIGS. 1 and 2.
Figure 13B:
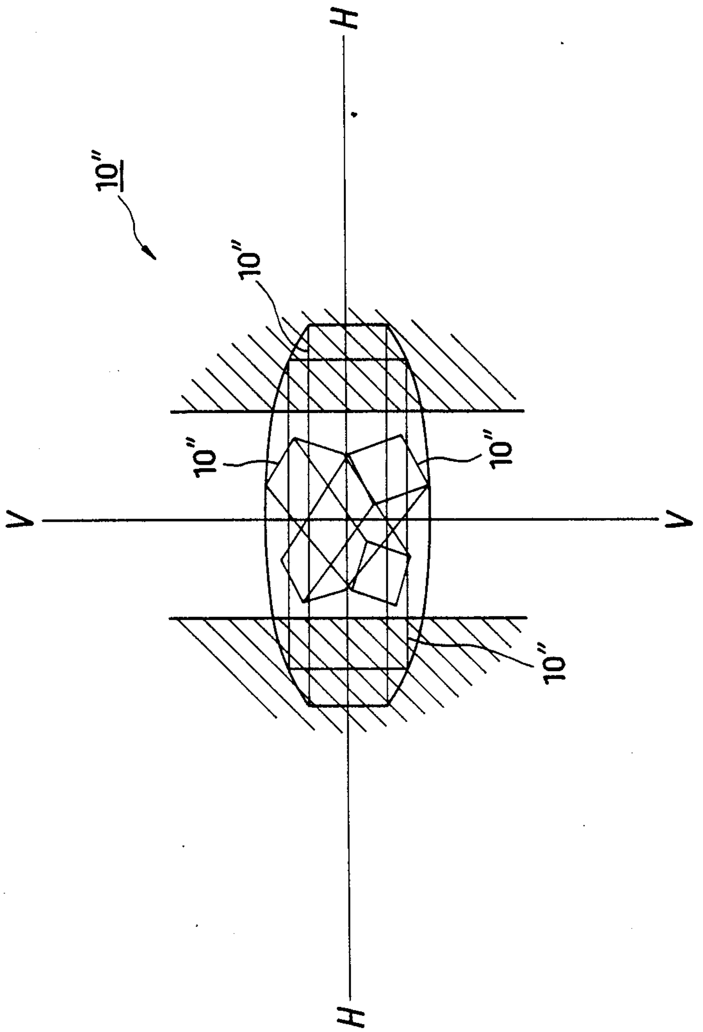

When the simulation analysis was carried out on a case wherein the light reflecting surface 6 is of a paraboloid of revolution, such results as shown in FIGS. 13A and 13B were obtained.

That is, as shown in FIG. 13, the images 10 , 10' . . . 10' of the filament 10 reflected in the front cover lens 12 are positioned near the center causing most of them to be positioned within said circle (see FIG. 13A). This means that as is shown in FIG. 13B, the hatched portions of the patterns 10', 10', . . . 10' on the screen are the useless portions which are to get in the converging lens 7.

Referring to FIGS. 14 to 24, there is shown a vehicular headlamp 17 of a second embodiment of the present invention. As will become apparent as the description proceeds, the headlamp of this embodiment is of a projector type.

Figure 14:
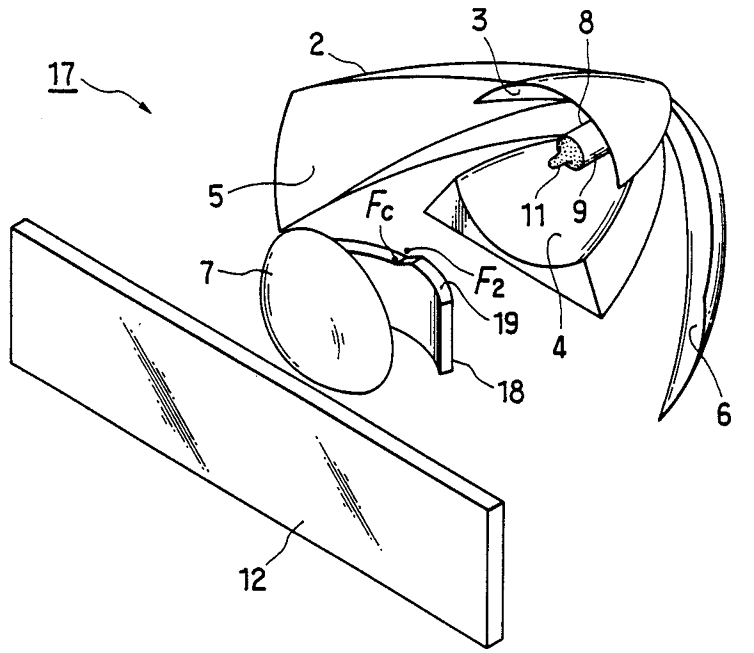
Figure 15:
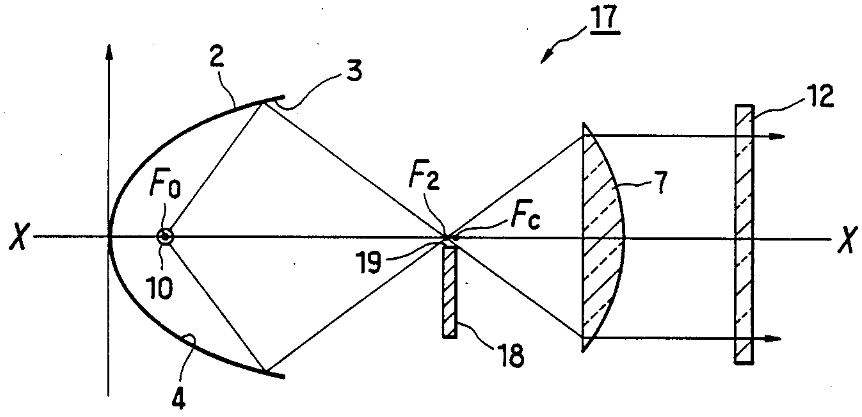
Figure 16:
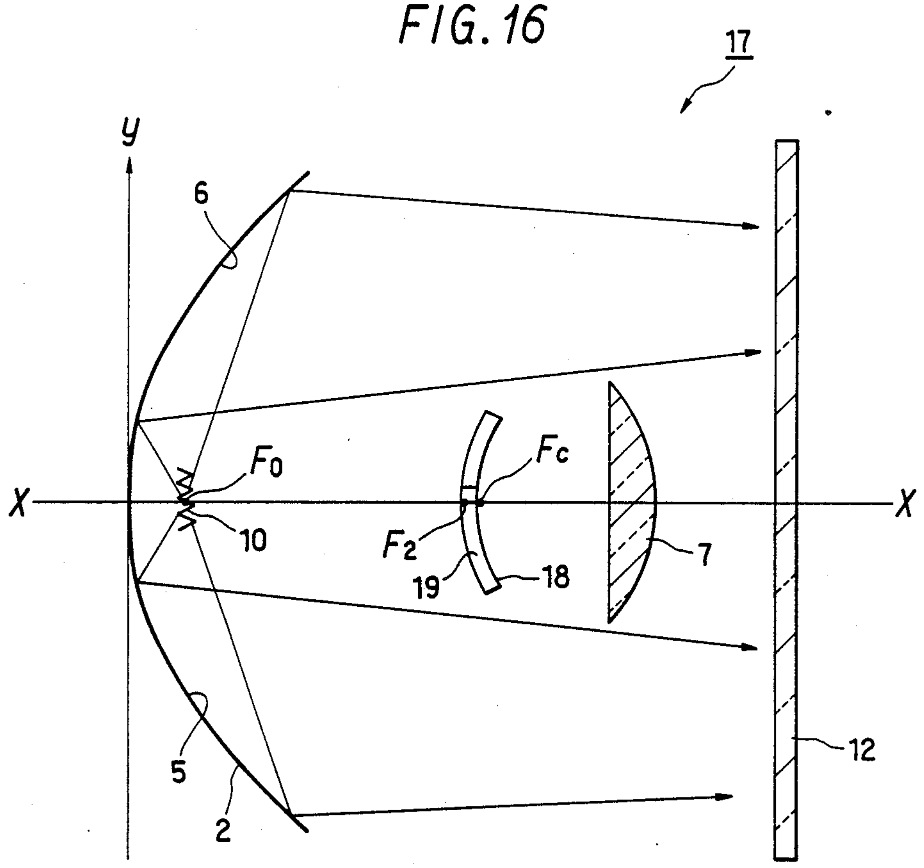

CONSTRUCTION (see FIGS. 14 to 16)

The headlamp 17 of this second embodiment has substantially the same parts as the above-mentioned headlamp 1 of the first embodiment except a shading plate.

The shading plate is denoted by numeral 18 which has an upper edge 19. The shading plate 18 is arranged in the vicinity of the horizontal focal line $F_2$ of the upper and lower light reflecting surfaces 3 and 4 to block lower portions of the reflected light rays from the reflector 2. The converging lens 7 is so arranged that the focus $F_c$ thereof is positioned on the middle portion of the upper edge 19 of the shading plate 18.

Figure 17:
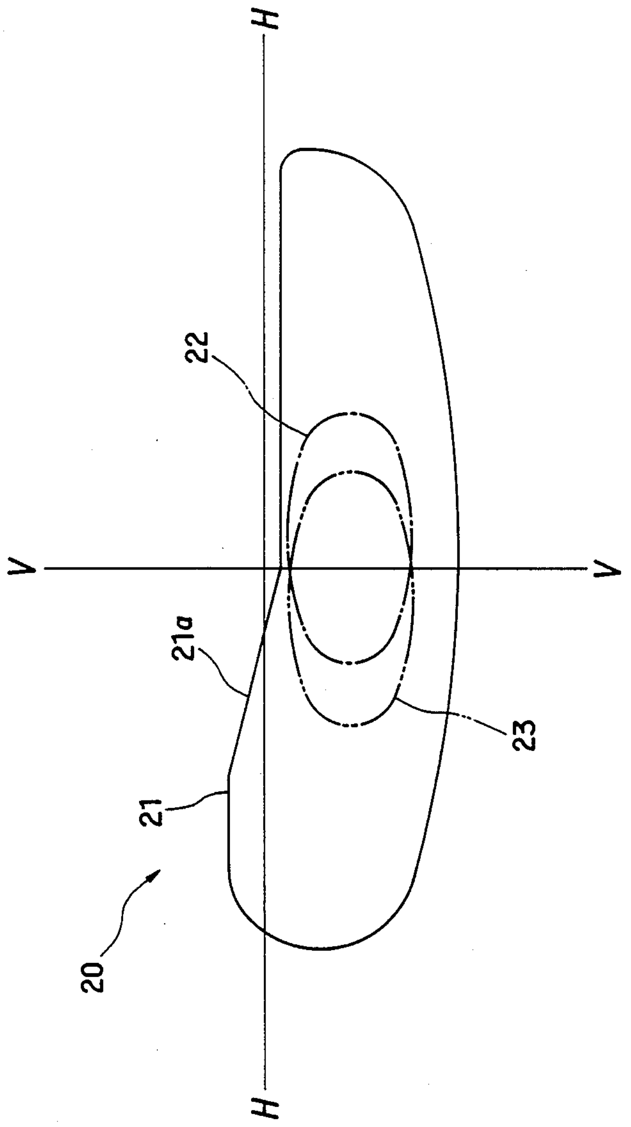

PROJECTED BEAM PATTERN (see FIG. 17)

When the headlamp 17 is energized, such a projected beam pattern 20 as shown in FIG. 17 is provided. In the pattern 20, the zone denoted by numeral 21 is an illuminated zone which is provided by the reflected light rays from the upper and lower parts 3 and 4 of the reflector 2. It is to be noted that the upper edge 21a of the pattern 20 is a reversed image of the upper edge 19 of the shading plate 18, which is usually called 'cut pattern'.

The zone denoted by numeral 22 is an illuminated zone which is provided by the reflected light rays from the left part 5 of the reflector 2, while, the zone denoted by numeral 23 is an illuminated zone which is provided by the reflected light rays from the right part 6 of the reflector 2. These zones 22 and 23 are largely overlapped to produce the hot zone.

In order to use the headlamp 17 as a so-called low beam projector, it becomes necessary to prevent the hot zone from projecting above the horizontal line 'H—H'. In order to achieve this, the following measures may be used.

(a) Positioning the filament 10 above the focus of the left and right parts 5 and 6 of the reflector 2;

(b) Inclining the optical axes of the left and right parts 5 and 6 downwardly;

(c) Displacing the shading plate 18 to a somewhat lower position and inclining the entire of the headlamp downward.

In the following, modifications of the second embodiment will be described.

Figure 18:
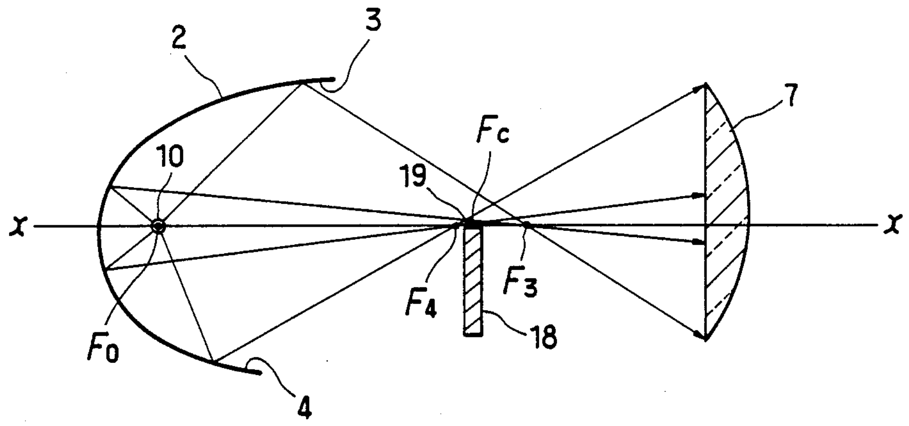
Figure 19:
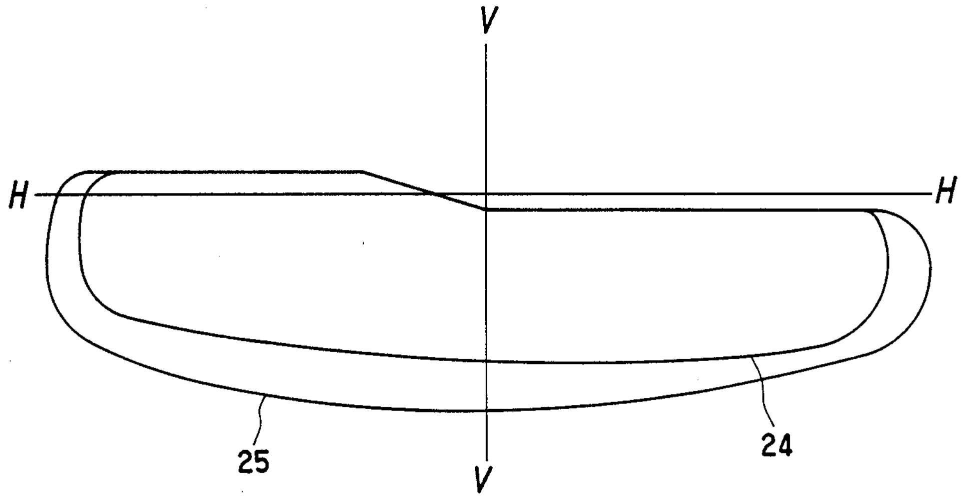

FIRST MODIFICATION (see FIGS. 18 AND 19)

In this modification, the horizontal focal line $F_3$ of the upper part 3 of the reflector 2 is positioned just before the upper edge 19 of the shading plate 18, and the horizontal focal line $F_4$ of the lower part 4 is positioned just behind the upper edge 19 of the shading plate 18.

As is understood from FIG. 18, with this arrangement, the amount of the reflected light rays blocked by the shading plate 18 is reduced. Thus, the light loss is minimized and the undesired chromatic aberration becomes small.

FIG. 19 shows a projected beam pattern which is provided by this first modification. The zone denoted by numeral 24 is the zone provided by the light rays from the upper surface 3, while, the zone denoted by numeral 25 is the zone provided by the light rays from the lower surface 4.

Figure 20:
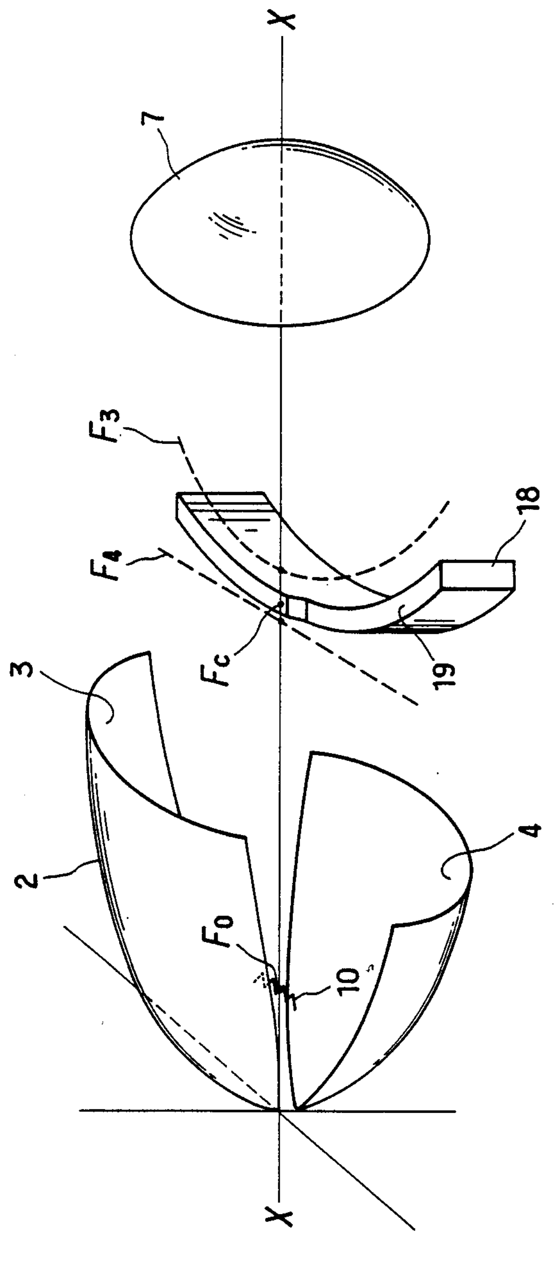
Figure 21:
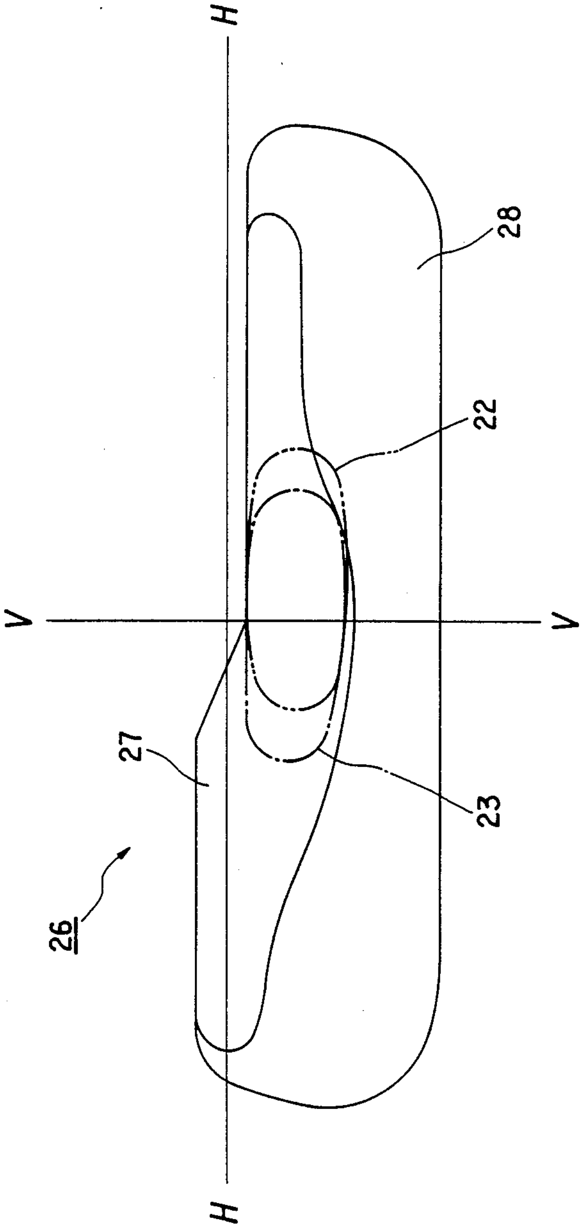
Figure 22:
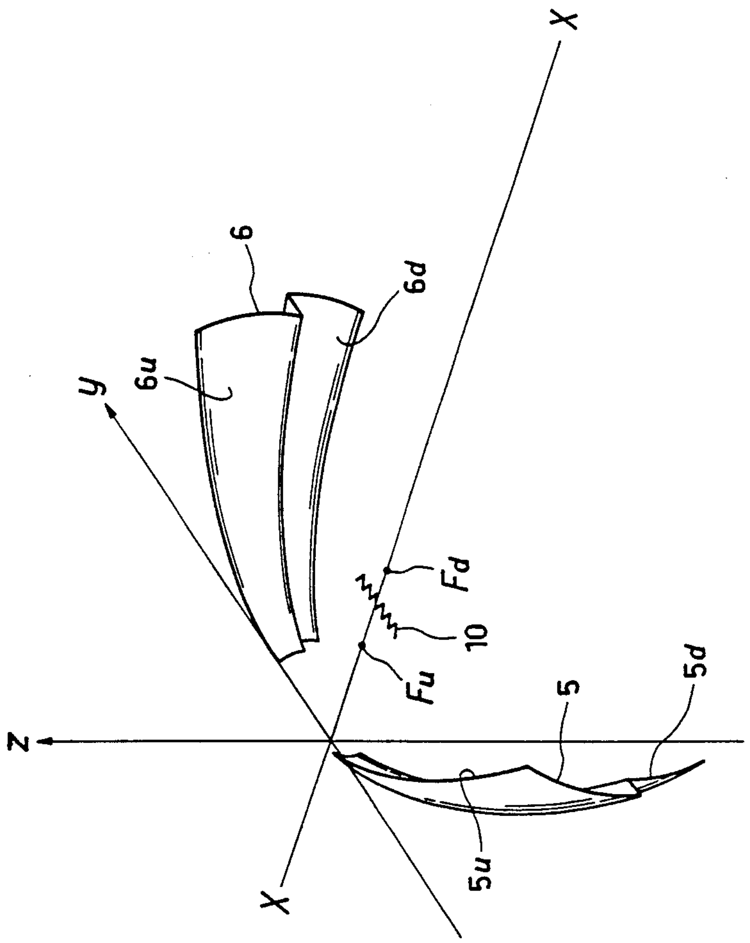

SECOND MODIFICATION (see FIGS. 20 AND 21)

In this second modification, the shading plate 18 is curved in accordance with the curvature of field of the converging lens 7. The focal line of the upper light reflecting surface 3 is positioned just before the upper edge 19 of the shading plate 18 and the focal line is curved in accordance with the curvature of the shading plate 18, and the horizontal focal line of the lower light reflecting surface 4 is positioned just behind the upper edge 19 of the shading plate 18.

FIG. 21 shows a projected beam pattern provided by the second embodiment. The compact zone denoted by numeral 27 is the zone provided by the light rays from the upper light reflecting surface 3, while, the spreaded zone denoted by numeral 28 is the zone provided by the lower light reflecting surface 4.

THIRD MODIFICATION (see FIGS. 22, 23, 24A AND 24B)

In this modification, each of the left and right light reflecting surfaces 5 and 6 consists of an upper part '**5*u*' or '6*u*' and a lower part '5*d*' or '6*d*'. The focus $F_u$ of the upper parts '5*u*' and '6*u*' is positioned just behind the filament 10, and the focus $F_d$ of the lower parts '5*d*' and '6*d*' is positioned just before the filament 10**.

Figure 23:
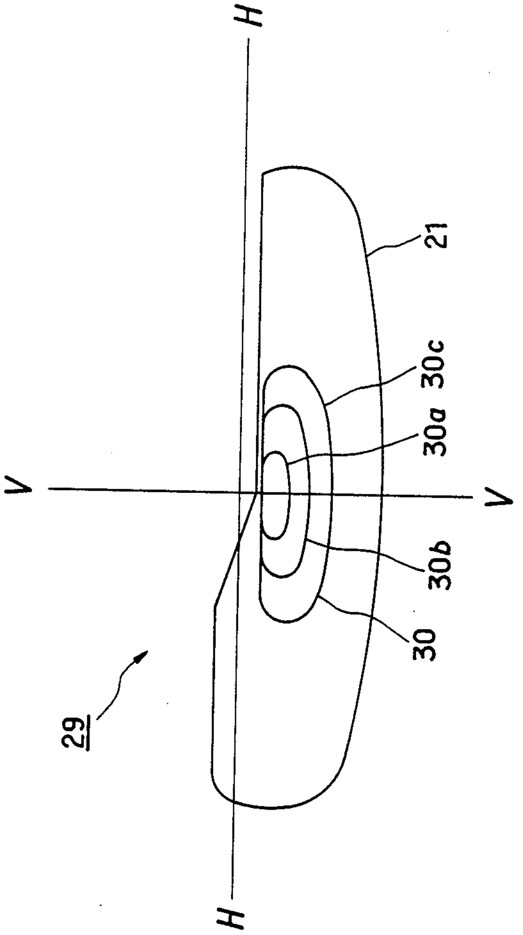

FIG. 23 shows a projected beam pattern 29 provided by the third modification. The zone denoted by numeral 30 is the zone provided by the reflected light rays from the left and right light reflecting surfaces 5 and 6. In this modification, the highly illuminated zone **30*a* of the zone 30** is positioned close to the line 'H—H'.

In order to make clear this advantageous phenomenon, the inventor carried out a computer aided simulation analysis on the third modification.

Figure 24A:
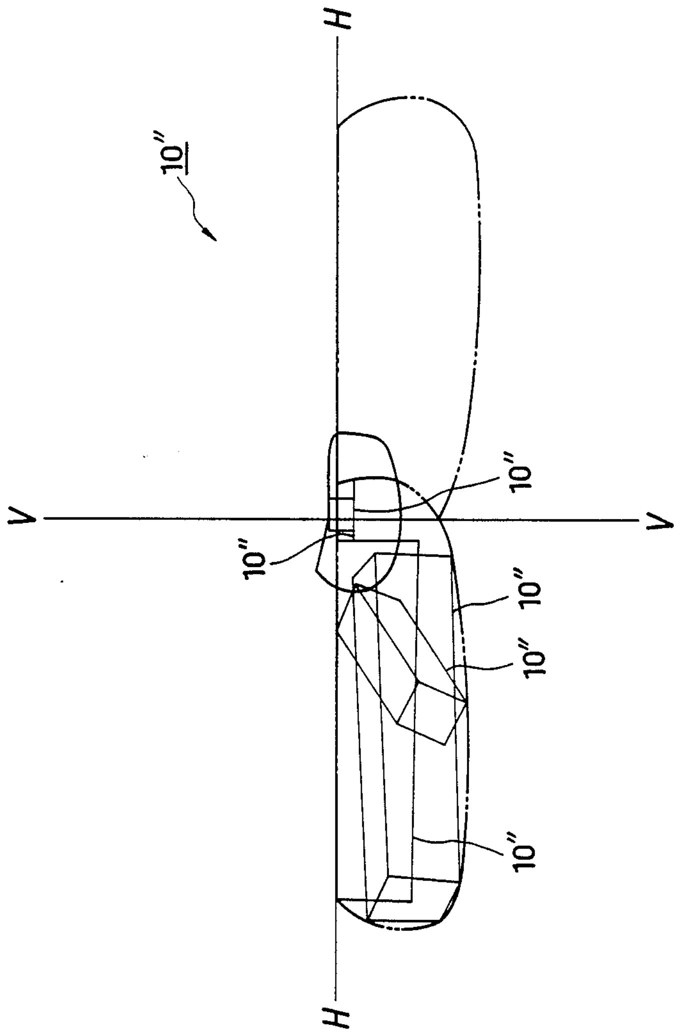
FIGS. 24A and 24B are views of a projected image of a light emitting filament, which are the results of the computer aided simulation analysis.
Figure 24B:
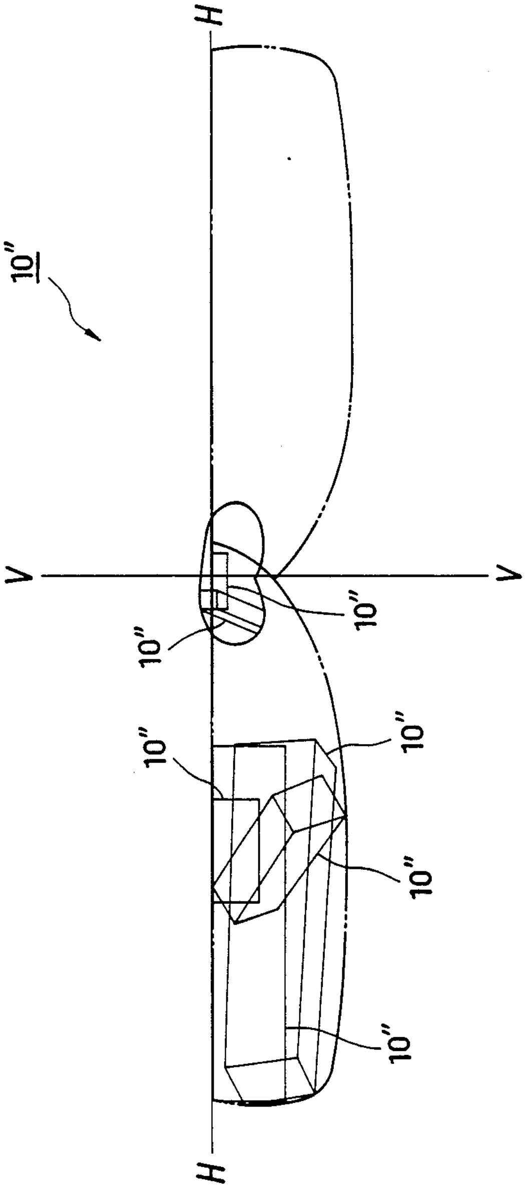

The results of this analysis is shown in FIGS. 24A and 24B.

The conditions of the simulation are as follows.

The focal distance of the parabolic line provided by the upper part '**5*u*' and the focal distance of the first focus of the elliptic line provided by the part '5*u*' are both 18 mm, the focal distance of the second focus of the elliptic line is 408.3 mm, the angle at which the x-axis is inclined rightward about the first focus relative to the light projecting axis 'X—X' is 11.8 degrees, the focal distance of the parabolic line provided by the lower part '5*d*' and the focal distance of the first focus of the elliptic line provided by the lower part '5*d*' are both 22 mm, the focal distance of the second focus of the elliptic line is 408.3 mm angle at which the x-axis is inclined rightward about the first focus relative to the light projecting axis 'X—X', and the filament 10** is shaped like a square pole which is 5 mm in length and 1.5 mm in each side. The filament is positioned with respect to the x, y and z coordinates (viz., 20 mm, 0 mm, 0.5 mm).

The results of the computer aided simulation analysis are shown in FIGS. 24A and 24B.

FIG. 24A shows images 10', 10', . . . 10' of the filament 10 which are produced on a screen by the reflected light rays from the upper part 5*u* of the left light reflecting surface 5. The screen is positioned at a distance of 10 m from the headlamp FIG. 24B shows images 10', 10', . . . 10' of the filament 10 which are produced on the screen by the reflected light rays from the lower part '5*d*' of the left light reflecting surface 5.

As is seen from these drawings, highly illuminated zones 31 and 32 are positioned close to the H—H line.

In order to practically apply the results of the simulation analysis to a headlamp, the entire o f the reflector 2 is inclined downward at about 0.5 to 0.6 degrees with respect to the horizontal line,'H—H'.

Figure 25:
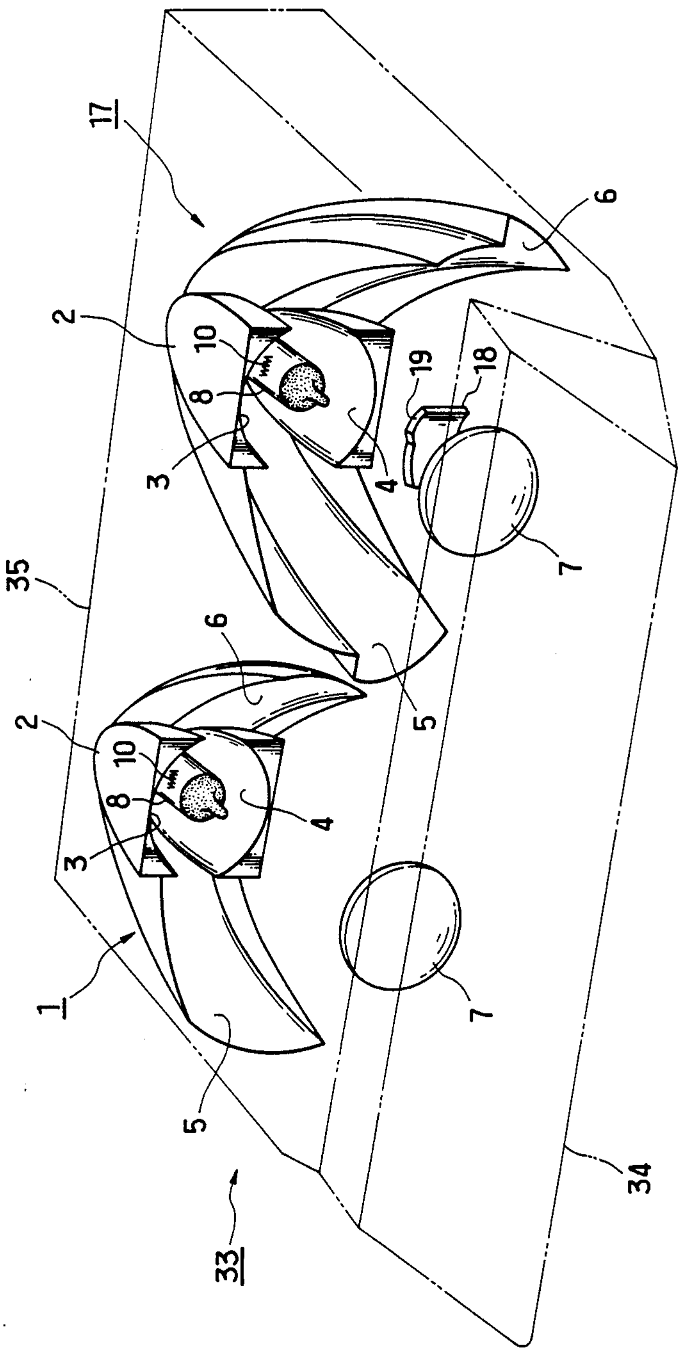
FIG. 25 is a schematically illustrated perspective view of a vehicular headlamp unit to which the present invention is practically applied.

VEHICULAR HEADLAMP UNIT (see FIG. 25)

FIG. 25 shows a vehicular headlamp unit 33 having both low and high beam projectors to which the present invention is practically applied. As shown, the headlamp 1 of the first embodiment is used as the high beam projector and the headlamp 17 of the second embodiment is used as the low beam projector. Denoted by numeral 35 is a housing for housing the headlamps 1 and 17, and denoted by numeral 34 is a front transparent cover for the housing 35.

What is claimed is:

1. A vehicular headlamp comprising:

a compound light reflector having a concave light reflecting surface which consists of upper, lower, left and right triangular parts which are radially arranged about a given portion of said reflector, said upper and lower parts having a substantially common focus and being so arranged that when light rays are emitted from the position of said common focus, the upper and lower parts reflect the light rays forward to form a horizontal focal line before the common focus, each of said left and right parts being so shaped and arranged that when cut by a horizontal plane, it shows an elliptic line along the cut edge, and when cut by a vertical plane, it shows a parabolic line along the cut edge, said upper, lower, left and right parts being so arranged as to have their focuses positioned at generally same positions;

a light source positioned at said common focus; and a converging lens positioned in front of said horizontal focal line and arranged in such a manner that a focus of said converging lens is positioned in the vicinity of said horizontal focal line, wherein the light rays produced by said light source and reflected by said left and right parts are forced to travel beside said converging lens to produce a hot zone in a projected beam pattern and the light rays produced by said light source and reflected by said upper and lower parts are forced to pass through said converging lens to contribute to formation of illuminated zones in the projected beam pattern which are positioned beside said hot zone.

2. A vehicular headlamp as claimed in claim 1, in which each of said upper and lower parts is shaped to have a 'paraboloid and ellipsoid' compound light reflecting surface.

3. A vehicular headlamp as claimed in claim 1, in which each of said upper and lower parts has such a shape that when cut by a horizontal plane, it shows an elliptic line along the cut edge, and when cut by a vertical plane, it shows another elliptic line along the cut edge.

4. A vehicular headlamp as claimed in claim 1, in which the optical axes of said upper and lower parts extend forward to constitute a light projecting axis, the optical axis of said left part is inclined in one lateral direction with respect to said light projecting axis and the optical axis of said right part is inclined in the other lateral direction with respect to said light projecting axis.

5. A vehicular headlamp as claimed in claim 4, in which said light source is a filament installed in an electric bulb.

6. A vehicular headlamp as claimed in claim 5, in which said filament extends perpendicular to said light projecting axis while passing through said common focus of said upper and lower parts of said light reflector.

7. A vehicular headlamp as claimed in claim 6, in which said electric bulb includes a glass tube whose tip is coated with a light blocking film so that the light rays produced by said filament are prevented from directly reaching said converging lens.

8. A vehicular headlamp as claimed in claim 1, further comprising a transparent cover member which is arranged to cover the front of said reflector with an interposal of said converging lens therebetween

9. A vehicular headlamp as claimed in claim 1 further comprising a shading plate having an upper edge, said shading plate being arranged in the vicinity of said horizontal focal line of said upper and lower parts, said focus of said converging lens being positioned on a middle portion of said upper edge of said shading plate.

10. A vehicular headlamp as claimed in claim 9 in which, each of said upper and lower parts is shaped to have a 'paraboloid and ellipsoid' compound light reflecting surface.

11. A vehicular headlamp as claimed in claim 9 in which each of said upper and lower parts has such a shape that when cut by a horizontal plane, it shows an elliptic line along the cut edge, and when cut by a vertical plane, it shows another elliptic line long the cut edge.

12. A vehicular headlamp as claimed in claim 9, in which the optical axes of said upper and lower parts extend forward to constitute a light projecting axis, the optical axis of said left part is inclined in one lateral direction with respect to said light projecting axis and the optical axis of said right part is inclined in the other lateral direction with respect to said light projecting axis.

13. A vehicular headlamp as claimed in claim 12, in which said light source is a filament installed in an electric bulb.

14. A vehicular headlamp as claimed in claim 13, in which said filament extends perpendicular to said light projecting axis while passing through said common focus of said upper and lower parts of said light reflector.

15. A vehicular headlamp as claimed in claim 14, in which said electric bulb includes a glass tube whose tip is coated with a light blocking film, so that the light rays produced by said filament are prevented from directly reaching said converging lens.

16. A vehicular headlamp as claimed in claim 9, further comprising a transparent cover member which is arranged to cover the front of said reflector with an interposal of said converging lens therebetween.

17. A vehicular headlamp as claimed in claim 9, in which the horizontal focal line of the upper part of said reflector is positioned just before the upper edge of said shading plate, and in which the horizontal focal line of the lower part of said reflector is positioned just behind the upper edge of said shading plate.

18. A vehicular headlamp as claimed in claim 9, in which said shading plate is curved in accordance with the curvature of field of said converging lens, the focal line of the upper part of said reflector is positioned just before the upper edge of the shading plate and curved in accordance with the curvature of said shading plate and the horizontal focal line of the lower part of said reflector is positioned just behind the upper edge of said shading plate.

19. A vehicular headlamp as claimed in claim 9, in which each of said left and right parts of the reflector consists of upper and lower parts, the focus of the upper part being positioned just being said light source and the focus of the lower part being positioned just before the light source.

20. A vehicular headlamp unit comprising:

a high beam projector including:

a compound light reflector having a concave light reflecting surface which consists of upper, lower, left and right triangular parts which are radially arranged about a given portion of said o reflector, said upper and lower parts having a common focus and being so arranged that when light rays are emitted from the position of said common focus, the upper and lower parts reflect the light rays forward to form a horizontal focal line before the common focus, each of said left and right parts being so shaped and arranged that when cut by a horizontal plane, it shows an elliptic line along the cut edge, and when cut by a vertical plane, it shows a parabolic line along the cut edge, said upper, lower, left and right parts being so arranged as to have their focuses positioned at generally same positions;

a light source positioned at said common focus; and a converging lens positioned in front of said horizontal focal line and arranged in such a manner that a focus of said converging lens is positioned in the vicinity of said horizontal focal line, and a low beam projector including:

a compound light reflector having a concave light reflecting surface which consists of upper, lower, left and right triangular parts which are radially arranged about a given portion of said reflector, said upper and lower parts having a common focus and being so arranged that when light rays are emitted from the position of said common focus, the upper and lower parts reflect the light rays forward to form a horizontal focal line before the common focus, each of said left and right parts being so shaped and arranged that when cut by a horizontal plane, it shows an elliptic line along the cut edge, and when cut by a vertical plane, it shows a parabolic line along the cut edge, said upper, lower, left and right parts being so arranged as to have their focuses positioned at generally same positions;

a light source positioned at said common focus;

a shading plate having an upper edge, said shading plate being arranged in the vicinity of the horizontal focal line; and a converging lens positioned in front of said horizontal focal line and arranged in such a manner that a focus of said converging lens is positioned on a middle portion of the upper edge of said shading plate.

* * * * *